(12) United States Patent
Okumura

(10) Patent No.: US 9,587,128 B2
(45) Date of Patent: Mar. 7, 2017

(54) WATER-BASED INK FOR INK-JET RECORDING AND INK CARTRIDGE

(71) Applicant: Brother Kogyo Kabushiki Kaisha, Nagoya-shi, Aichi-ken (JP)

(72) Inventor: Yuki Okumura, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/656,207

(22) Filed: Mar. 12, 2015

(65) Prior Publication Data

US 2015/0275005 A1    Oct. 1, 2015

(30) Foreign Application Priority Data

Mar. 31, 2014    (JP) .................... 2014-072041

(51) Int. Cl.
*C09D 11/328*    (2014.01)
*C09D 11/38*    (2014.01)

(52) U.S. Cl.
CPC ............ *C09D 11/328* (2013.01); *C09D 11/38* (2013.01)

(58) Field of Classification Search
CPC ......... C09D 11/54; C09D 11/40; C09D 11/30; C09D 11/38
See application file for complete search history.

(56) References Cited

U.S. PATENT DOCUMENTS

| 4,046,843 | A | * | 9/1977 | Sano | .................... | B01D 67/009 |
| | | | | | | 210/500.23 |
| 5,911,815 | A | * | 6/1999 | Yamamoto | ............. | C09D 11/40 |
| | | | | | | 106/31.27 |

| 7,387,665 | B2 | 6/2008 | Jackson et al. |
| 8,016,404 | B2 | 9/2011 | Kato et al. |
| 8,506,069 | B2 | 8/2013 | Saito |

(Continued)

FOREIGN PATENT DOCUMENTS

| JP | H10-140059 A | 5/1998 |
| JP | 2008-246821 A | 10/2008 |

(Continued)

*Primary Examiner* — Stephen Meier
*Assistant Examiner* — John P Zimmermann
(74) *Attorney, Agent, or Firm* — Banner & Witcoff, Ltd.

(57) ABSTRACT

A water-based ink for ink jet recording contains a colorant containing a dye; water; an anionic zirconium complex ion; and a surfactant represented by the formula (1)

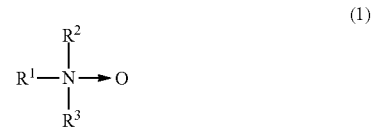

(1)

in the formula (1):

$R^1$ is an alkyl group having 12 to 18 carbon atoms or an $R^4$—CO—NH group ($R^4$ is an alkyl group having 12 carbon atoms);

each of $R^2$ and $R^3$ is a methyl group or a hydroxyethyl group; and $R^2$ and $R^3$ may be identical to or different from each other.

Chromaticness of a recorded matter is improved without any increase in dye concentration.

14 Claims, 1 Drawing Sheet

(56) References Cited

U.S. PATENT DOCUMENTS

| | | | |
|---|---|---|---|
| 2003/0023021 A1* | 1/2003 | Sakuma | 526/348 |
| 2005/0036018 A1* | 2/2005 | Yanagihara | D06P 5/30 347/100 |
| 2006/0128829 A1* | 6/2006 | Breton | C09D 11/326 523/160 |
| 2006/0128830 A1* | 6/2006 | Breton et al. | 523/160 |
| 2007/0076071 A1* | 4/2007 | Iu | C09D 11/40 347/100 |
| 2007/0242091 A1 | 10/2007 | Jackson et al. | |
| 2008/0241398 A1 | 10/2008 | Kato et al. | |
| 2010/0242794 A1* | 9/2010 | Nagano | C09D 11/38 106/31.85 |
| 2011/0234689 A1 | 9/2011 | Saito | |
| 2014/0336401 A1* | 11/2014 | Toyama | A61Q 5/00 556/446 |
| 2014/0356309 A1* | 12/2014 | Ozaki | C08L 83/06 424/70.122 |

FOREIGN PATENT DOCUMENTS

| | | |
|---|---|---|
| JP | 2009-533526 A | 9/2009 |
| JP | 2011-201259 A | 10/2011 |

\* cited by examiner

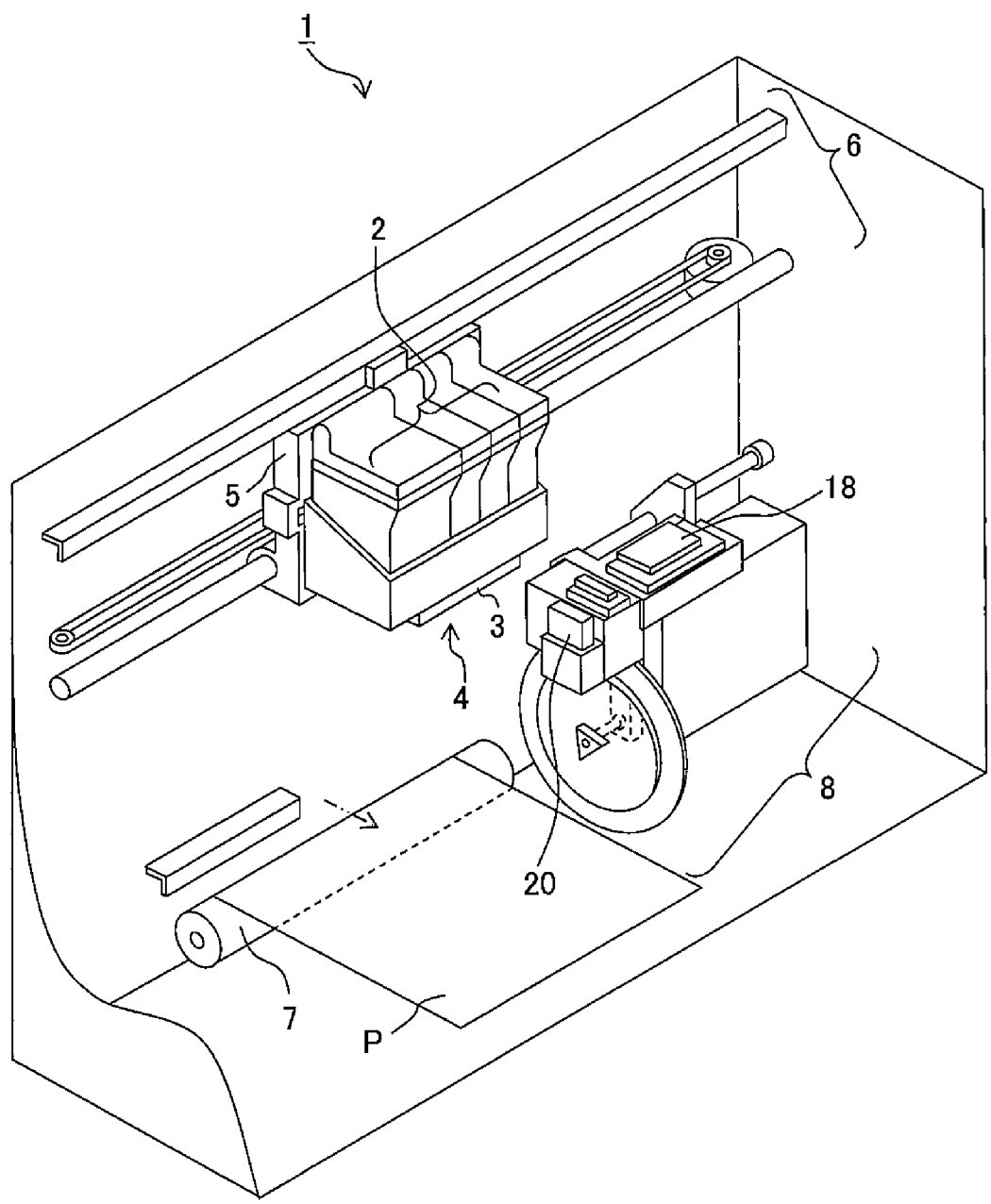

WATER-BASED INK FOR INK-JET RECORDING AND INK CARTRIDGE

CROSS REFERENCE TO RELATED APPLICATION

The present application claims priority from Japanese Patent Application No. 2014-072041, filed on Mar. 31, 2014, the disclosure of which is incorporated herein by reference in its entirety.

BACKGROUND OF THE INVENTION

Field of the Invention

The present invention relates to a water-based ink for ink jet recording and an ink cartridge.

Description of the Related Art

As a method for improving the chromaticness of a recorded matter (printed matter) obtained by using a water-based dye ink for ink-jet recording, there is known a method for increasing dye concentration. For example, see United States Patent Application Publication No. US 2007/0242091A1 corresponding to Published Japanese Translation of PCT International Publication for Patent Application No. 2009-533526. However, increasing the dye concentration has problems, such as the increase in cost and the decrease in stability of the water-based dye ink. In view of the above, an object of the present teaching is to provide a water-based dye ink for ink-jet recording which can improve chromaticness of the recorded matter without any increase in dye concentration.

SUMMARY OF THE INVENTION

According to a first aspect of the present teaching, there is provided a water-based ink for ink-jet recording including:
a colorant containing a dye;
water;
an anionic zirconium complex ion; and
a surfactant represented by the following formula (1)

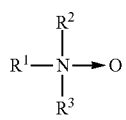

in the formula (1):
$R^1$ is an alkyl group having 12 to 18 carbon atoms or an $R^4$—CO—NH group ($R^4$ is an alkyl group having 12 carbon atoms);
each of $R^2$ and $R^3$ is a methyl group or a hydroxyethyl group; and
$R^2$ and $R^3$ may be identical to or different from each other.

The water-based ink for ink-jet recording of the present teaching obtained by using the anionic zirconium complex ion and the surfactant represented by the formula (1) in combination can improve the chromaticness without any increase in dye concentration.

According to a second aspect of the present teaching, there is provided an ink cartridge including the water-based ink for ink-jet recording as defined in the first aspect of the present teaching.

BRIEF DESCRIPTION OF THE DRAWINGS

FIG. 1 is a schematic perspective view of an exemplary construction of an ink-jet recording apparatus of the present teaching.

DESCRIPTION OF THE PREFERRED EMBODIMENTS

An explanation will be made about a specific example of a water-based ink for ink-jet recording of the present teaching. In the following, the water-based ink for ink-jet recording is also referred to as "water-based ink" or "ink" in some cases. The water-based ink of the present teaching contains a colorant, an anionic zirconium complex ion, a surfactant represented by the formula (1), and water. The colorant contains a dye.

The dye is not particularly limited and can be exemplified, for example, by direct dye, acid dye, basic dye, reactive dye, etc. Among these dyes, the basic dye is a cationic dye, and the direct, acid and reactive dyes are anionic dyes. More specifically, the dye may be exemplified by Color Index (hereinafter referred to as C. I.) Direct Black, C.I. Direct Blue, C.I. Direct Red, C.I. Direct Yellow, C.I. Direct Orange, C.I. Direct Violet, C.I. Direct Brown, C.I. Direct Green; C.I. Acid Black, C.I. Acid Orange, C.I. Acid Violet; C.I. Basic Black, C.I. Basic Blue, C.I. Basic Red, C.I. Basic Violet; C.I. Food Black; etc. The C.I. Direct Black is exemplified, for example, by C. I. Direct Black 17, 19, 32, 51, 71, 108, 146, 154, 168, etc. The C.I. Direct Blue is exemplified, for example, by C. I. Direct Blue 6, 22, 25, 71, 86, 90, 106, 199, etc. The C.I. Direct Red is exemplified, for example, by C. I. Direct Red 1, 4, 17, 28, 83, 227, etc. The C.I. Direct Yellow is exemplified, for example, by C.I. Direct Yellow 12, 24, 26, 86, 98, 132, 142, 173, etc. The C.I. Direct Orange is exemplified, for example, by C. I. Direct Orange 34, 39, 44, 46, 60, etc. The C.I. Direct Violet is exemplified, for example, by C. I. Direct Violet 47, 48, etc. The C.I. Direct Brown is exemplified, for example, by C. I. Direct Brown 109, etc. The C.I. Direct Green is exemplified, for example, by C. I. Direct Green 59, etc. The C.I. Acid Black is exemplified, for example, by C. I. Acid Black 2, 7, 24, 26, 31, 52, 63, 112, 118, etc. The C.I. Acid Blue is exemplified, for example, by C. I. Acid Blue 9, 22, 40, 59, 90, 93, 102, 104, 117, 120, 167, 229, 234, etc. The C.I. Acid Red is exemplified, for example, by C. I. Acid Red 1, 6, 32, 37, 51, 52, 80, 85, 87, 92, 94, 115, 180, 256, 289, 315, 317, etc. The C.I. Acid Yellow is exemplified, for example, by C. I. Acid Yellow 11, 17, 23, 25, 29, 42, 61, 71, etc. The C.I. Acid Orange is exemplified, for example, by C. I. Acid Orange 7, 19, etc. The C.I. Acid Violet is exemplified, for example, by C. I. Acid Violet 49, etc. The C.I. Basic Black is exemplified, for example, by C.I. Basic Black 2, etc. The C.I. Basic Blue is exemplified, for example, by C.I. Basic Blue 1, 3, 5, 7, 9, 24, 25, 26, 28, 29, etc. The C.I. Basic Red is exemplified, for example, by C. I. Basic Red 1, 2, 9, 12, 13, 14, 37, etc. The C.I. Basic Violet is exemplified, for example, by C. I. Basic Violet 7, 14, 27, etc. The C.I. Food Black is exemplified, for example, by C. I. Food Black 1, 2, etc. Further, those described in examples which will be described later may be used as the dye.

The blending amount of the dye in the entire amount of the water-based ink is not particularly limited, and the blending amount is, for example, in a range of 0.1% by weight to 10% by weight, preferably in a range of 0.2% by weight to 8% by weight, and more preferably in a range of 0.3% by weight to 6% by weight.

The colorant may further contain any pigment in addition to the dye.

It is preferred that the water be ion-exchanged water or pure water (purified water). The blending amount of the water (water ratio) in the entire amount of the water-based ink is, for example, in a range of 10% by weight to 90% by weight, and preferably in a range of 40% by weight to 80% by weight. The water ratio may be, for example, the balance of the other components.

As described above, the water-based ink further contains the anionic zirconium complex ion (hereinafter referred to as "Zr complex ion" in some cases) and the surfactant represented by the formula (1). The water-based ink of the present teaching obtained by using the Zr complex ion and the surfactant represented by the formula (1) in combination can improve chromaticness without any increase in dye concentration. The mechanism for improving the chromaticness is supposed, for example, as follows. First, the Zr complex ion such as $[Zr(CO_3)_2(OH)_2]^{2-}$ is negatively charged in the water-based ink, and thus the Zr complex ion electrically repels or repulses the dye which is typically anionic. This prevents the aggregation or coagulation of the dye in the water-based ink. That is, the Zr complex ion works to satisfactorily disperse the dye in the water-based Mk before the water-based ink is discharged from an ink jet head. In a case that the water-based ink is discharged from the ink-jet head to land on a recording medium such as paper, a ligand of the Zr complex ion is more likely to be separated from the zirconium (Zr). Then, a zirconium ion from which the ligand is separated is positively charged as a metal ion to electrically attract the dye which is anionic. This prevents the dye from permeating paper fiber together with water, so that the dye can stay or remain on the paper surface. Accordingly, it is possible to improve the chromaticness of the recorded portion on the paper surface.

It is assumed that the surfactant represented by the formula (1) works on the dye on the paper surface as follows. That is, adding the surfactant represented by the formula (1) to the water-based ink reduces the surface tension of the water-based ink to allow the water-based ink to easily spread over the paper surface. The surfactant represented by the formula (1) has a coordinate bond and is positively charged in the water-based ink. Thus, the surfactant is more likely to be electrostatically coupled with the dye which is anionic, and also the dye tends to spread over the paper surface laterally so as to stay or remain on the paper surface. Accordingly, the dye remains on the paper surface while spreading over the paper surface by the effect of the electrostatic coupling with the surfactant, and further the dye is prevented from permeating the paper surface by the effect of the electrostatic coupling with the Zr complex ion. It is assumed that the chromaticness of the recorded portion on the paper surface is improved by the effects of both the surfactant and the Zr complex ion. These mechanisms, however, are just assumptions and the present teaching is not limited and restricted by these assumptions.

The Zr complex ion is formed by introducing, in the water-based ink, a complex salt (hereinafter also referred to simply as "Zr complex salt") which forms the Zr complex ion in a solution or water-based ink.

It is preferred that the Zr complex ion have an anionic ligand. The anionic ligand is exemplified, for example, by $CO_3^{2-}$ (carbonato) and $OH^-$ (hydroxo). It is preferred that the Zr complex ion be $[Zr(CO_3)_2(OH)_2]^{2-}$. It is preferred that a counter ion in the Zr complex salt be an alkali metal ion or a quaternary ammonium ion ($NH^{4+}$). The alkali metal ion is exemplified, for example, by sodium ion ($Na^+$), lithium ion ($Li^+$), and potassium ion ($K^+$). The Zr complex salt is exemplified, for example, by $K_2[Zr(CO_3)_2(OH)_2]$ and $(NH_4)_2[Zr(CO_3)_2(OH)_2]$. For example, a commercially available Zr complex salt may be used. The commercially available Zr complex salt is exemplified, for example, by "ZIRMEL 1000" and "BAYCOAT 20" produced by Nippon Light Metal Co., Ltd.

The Zr complex salt is contained in the water-based ink in order to introduce the Zr complex ion in the water-based ink. It is preferred that the blending amount of the Zr complex salt (the Zr complex salt ratio) in the entire amount of the water-based ink be 0.5% by weight or more. The water-based ink having better chromaticness can be obtained by making the Zr complex salt ratio 0.5% by weight or more. The upper limit of the Zr complex salt ratio is not particularly limited, which is, for example, 10% by weight or less, preferably 8% by weight or less, and more preferably 5% by weight or less.

The surfactant included in the water-based ink of the present teaching has the chemical structure represented by the formula (1).

(1)

In the formula (1), $R^1$ is an alkyl group having 12 to 18 carbon atoms or an $R^4$—CO—NH group ($R^4$ is an alkyl group having 12 carbon atoms). Each of $R^2$ and $R^3$ is a methyl group or a hydroxyethyl group. $R^2$ and $R^3$ may be identical to or different from each other. The arrow depicted in the formula (1) indicates the coordinate bond between a nitrogen atom (N) and an oxygen atom (O). In the formula (1), the alkyl group having 12 carbon atoms is exemplified by dodecyl group, and an alkyl group having 13 to 18 carbon atoms is exemplified by tridecyl group, tetradecyl group, pentadecyl group, hexadecyl group, heptadecyl group, and octadecyl group. The alkyl group may include a straight or branched chain.

The surfactant represented by the formula (1) may be, for example, lauryldimethylamine oxide, dihydroxyethyl laurylamine oxide, or lauric acid amide propyldimethylamine oxide. A commercially available product may be used as the surfactant represented by the formula (1). The commercially available product is exemplified, for example, by "Anhitol (trade name) 20N" (lauryldimethylamine oxide) produced by Kao Corporation; "UNISAFE (trade name) A-LM" (lauryldimethylamine oxide) and "UNISAFE (trade name) A-LE" (dihydroxyethyl laurylamine oxide) produced by NOF CORPORATION; and "Softazoline (trade name) LAO" (lauric acid amide propyldimethylamine oxide) produced by Kawaken Fine Chemicals Co., Ltd.

It is preferred that the blending amount of the surfactant represented by the formula (1) (the surfactant ratio) in the entire amount of the water-based ink be 3% by weight or more. The water-based ink having better chromaticness can be obtained by making the surfactant ratio 3% by weight or more. The upper limit of the surfactant ratio is not particularly limited, which is, for example, 15% by weight or less, preferably 10% by weight or less, and more preferably 5% by weight or less.

As described above, the water-based ink of the present teaching contains both the surfactant represented by the formula (1) and the Zr complex ion at the same time. Thus, the dye is more likely to remain on the paper surface by the above mechanisms, and thereby improving the chromaticness of the recorded matter. In order to obtain this effect effectively, it is desired that the blending ratio of the Zr complex salt, which generates the Zr complex ion, to the surfactant represented by the formula (1) in the water-based ink be controlled appropriately. According to results of examples which will be described later, the blending ratio of the Zr complex salt, which generates the Zr complex ion, to the surfactant represented by the formula (1) is preferably 0.1 to 0.7 by weight and more preferably 0.1 to 1.0 by weight (Zr complex salt which generates Zr complex ion/surfactant represented by formula (1)).

It is preferred that the water-based ink of the present teaching further contain a water-soluble organic solvent. The water-soluble organic solvent is exemplified, for example, by a humectant which prevents the water-based ink from drying at a nozzle tip portion of the ink-jet head and a penetrant which adjusts a drying rate of the water-based ink on the recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectants are used in combination. Among the above-described humectants, it is preferable to use polyvalent alcohols such as alkylene glycol, glycerol, etc.

The blending amount of the humectant in the entire amount of the water-based ink is, for example, in a range of 0% by weight to 95% by weight, preferably in a range of 5% by weight to 80% by weight, and more preferably in a range of 5% by weight to 50% by weight.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One type (kind) of the penetrant as described above may be used singly, or two or more types (kinds) of the penetrants as described above may be used in combination.

The blending amount of the penetrant in the entire amount of the water-based ink is, for example, in a range of 0% by weight to 20% by weight, preferably in a range of 0% by weight to 15% by weight, and more preferably in a range of 1% by weight to 4% by weight.

The water-based ink may further contain a conventionally known additive, as necessary. The additive is exemplified, for example, by surfactants other than the surfactant represented by the formula (1), pH-adjusting agents, viscosity-adjusting agents, surface tension-adjusting agents, and fungicides. The viscosity-adjusting agents are exemplified, for example, by polyvinyl alcohol, cellulose, and water-soluble resin.

The water-based ink can be prepared, for example, such that the colorant, water, the Zr complex salt, the surfactant represented by the formula (1), and optionally other additive component(s) are mixed uniformly in accordance with any conventionally known method, and undissolved matters are removed by a filter or the like.

It is possible to produce an ink cartridge by accommodating the water-based ink of the present teaching in an ink case. It is allowable to use any known ink case (body for ink cartridge) as the ink case (body) of the ink cartridge.

Next, an ink-jet recording apparatus and an ink-jet recording method of the present teaching will be explained.

The ink-jet recording apparatus of the present teaching is an ink-jet recording apparatus including an ink-accommodating section and an ink discharge mechanism, wherein an ink accommodated in the ink accommodating section is discharged by the ink discharge mechanism. The water-based ink for ink-jet recording of the present teaching is accommodated in the ink accommodating section. The ink accommodating section may be an exchangeable ink cartridge, as described above.

The ink-jet recording method of the present teaching is an ink-jet recording method for performing recording by discharging the water-based ink of the present teaching by the ink-jet system. The ink-jet recording method of the present teaching can be practiced by, for example, using the ink-jet recording apparatus described below. The recording includes printing text (character, letter), printing image or picture, printing, etc.

FIG. 1 depicts the configuration of an example of the ink-jet recording apparatus of the present teaching. As depicted in FIG. 1, an ink-jet recording apparatus 1 includes four ink cartridges 2, an ink discharge mechanism (ink-jet head) 3, a head unit 4, a carriage 5, a driving unit 6, a platen roller 7, and a purge device 8 as main constitutive components or parts.

The four ink cartridges 2 contain four colors of water-based inks respectively, the four colors being yellow, magenta, cyan, and black. For example, at least one of the water-based yellow ink, the water-based magenta ink, and the water-based cyan ink is the water-based ink for ink-jet recording of the present teaching. It is allowable to use commercially available water-based inks as the remaining inks other than the at least one water-based ink for ink-jet recording of the present teaching. The ink-jet head 3 disposed on the head unit 4 performs recording on a recording medium P (for example, a recording paper or recording paper sheet P). The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application Laid-open No. 2008-246821). The platen roller 7 extends in the reciprocating direction of the carriage 5 and is arranged to face or be opposite to the ink jet head 3.

The purge device 8 sucks any unsatisfactory ink which contains air bubbles, etc. accumulated in the ink-jet head 3. As the purge device 8, it is possible to use, for example, a conventionally known purge device disclosed in United States Patent Application Publication No. US 2008/0241398 A1 corresponding to Japanese Patent Application Laid-open No. 2008-246821.

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement (reciprocating movement) of the carriage 5. In FIG. 1, a cap 18 is provided to cover a plurality of nozzles of the ink jet head 3 which is returned to a reset position upon completion of the recording, so as to prevent the water-based ink from drying.

In the ink-jet recording apparatus 1 of this example, the four ink cartridges 2 are provided, together with the head unit 4, on one carriage 5. Note that, however, the present teaching is not limited to this. In the ink-jet recording apparatus 1, each of the four ink cartridges 2 may be provided on another carriage which is different from that for the head unit 4. Alternatively, each of the four ink cartridges 2 may be arranged and fixed inside the ink-jet recording apparatus 1, rather than being provided on the carriage 5. In such an aspect, for example, each of the four ink cartridges 2 and the head unit 4 which is provided on the carriage 5 are connected with a tube, etc., and each of the water-based inks is supplied from one of the four ink cartridges 2 to the head unit 4 via the tube.

An ink-jet recording using the ink-jet recording apparatus 1 is performed, for example, in the following manner. At first, a recording paper P is supplied or fed, for example, from a paper feeding cassette (not depicted in the drawings) arranged at a side of or at a position below the ink jet recording apparatus 1. The recording paper P is introduced or guided between the ink-jet head 3 and the platen roller 7. Then, a predetermined recording is performed on the fed or introduced recording paper P with the water-based inks discharged from the ink-jet head 3. The water-based ink of the present teaching has an excellent discharge property. The recording paper P after the recording is discharged from the ink-jet recording apparatus 1. A recorded matter recorded with the water-based ink of the present teaching has satisfactory chromaticness. In FIG. 1, the feed mechanism and discharge mechanism for the recording paper P are omitted.

Although the apparatus depicted in FIG. 1 adopts an ink-jet head of the serial type, the present teaching is not limited to this. The ink jet recording apparatus may be an apparatus adopting an ink-jet head of the line type.

EXAMPLES

Next, examples of the present teaching will be explained together with comparative examples. Note that the present teaching is not limited and is not restricted to the examples and the comparative examples which will be described below.

Examples 1-20 and Comparative Examples 1-14

Respective components of Composition of Water-based Ink indicated in TABLE 1 were mixed uniformly. After that, an obtained mixture was filtrated by using a polytetrafluoroethylene (PTFE) type membrane filter (pore size: 0.20 μm) produced by Toyo Roshi Kaisha, Ltd. Accordingly, water-based inks for ink-jet recording of Examples 1-20 and Comparative Examples 1-14 were obtained. In TABLE 1, Dyes (Y-1), (M-1), and (C-1) are typically or representatively represented by the formulae (Y-1), (M-1), and (C-1), respectively.

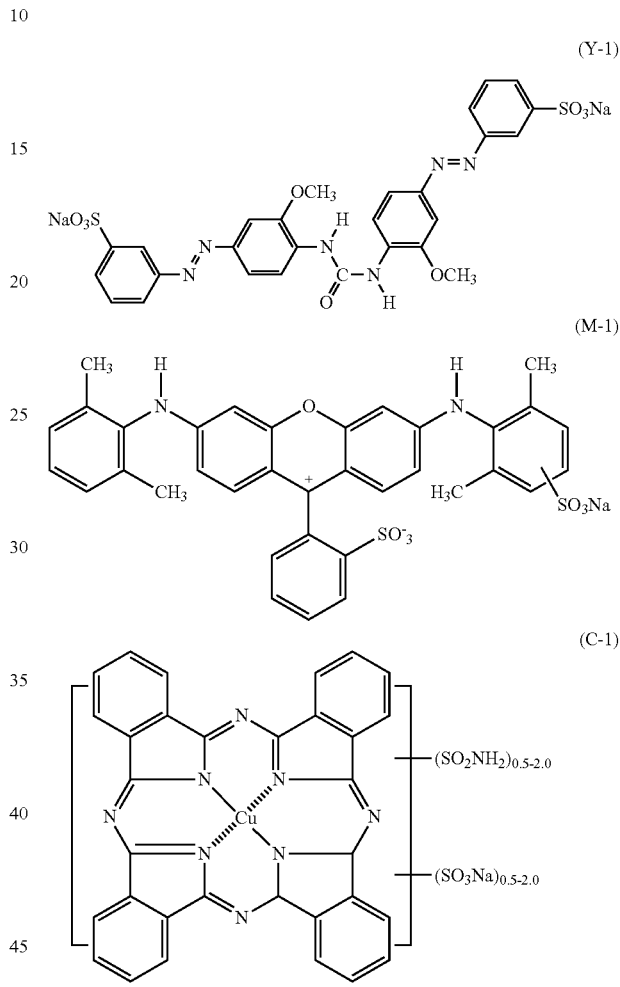

With respect to the water-based ink of each of Examples 1-20 and Comparative Examples 1-14, chromaticness evaluation was performed by the following method.

<Evaluation of Chromaticness>

A digital multi-function peripheral MFC-J4510N provided with an ink-jet printer manufactured by BROTHER KOGYO KABUSHIKI KAISHA was used to record an image including a single-color patch on a plain paper sheet, with a resolution of 600 dpi×300 dpi, by using the water-based ink of each of Examples 1-20 and Comparative Examples 1-14. Accordingly, each evaluation sample was made. The chromaticness (C*) of the evaluation sample was measured by using a spectrophotometric colorimetry meter "SpectroEye" (light source: $D_{50}$, field: 2°, density: ANSI T) manufactured by X-RITE INC., and the chromaticness was evaluated in accordance with the following evaluation criterion. As the plain paper, "4200" produced by XEROX CORPORATION was used.

Chromaticness Evaluation and Evaluation Criterion

The chromaticness of the water-based ink prepared in each of Examples 1-20 and Comparative Examples 1-14 was evaluated as follows. A water-based ink, among the water-based inks of Comparative Examples 1 to 4, which was obtained under the same conditions as those of an evaluation target ink except that the Zr complex salt and the surfactant represented by the formula (1) were not used, is referred to as a comparison ink. The degree of increase in chromaticness of the evaluation target ink relative to the chromaticness of the comparison ink was defined by using the following evaluation criterion.

AA: 3≤(chromaticness of evaluation target ink−chromaticness of comparison ink)

A: 2.3≤(chromaticness of evaluation target ink−chromaticness of comparison ink)<3

B: (chromaticness of evaluation target ink−chromaticness of comparison ink)<2.3

The compositions of the water-based inks and the measurement results of chromaticness of the water-based inks of Examples 1-20 and Comparative Examples 1-14 are indicated in TABLE 1.

TABLE 1

| | | EXAMPLES | | | | | | | | | |
|---|---|---|---|---|---|---|---|---|---|---|---|
| | | 1 | 2 | 3 | 4 | 5 | 6 | 7 | 8 | 9 | 10 |
| Composition of Water-based Ink (% by weight) | C.I. Direct Yellow 86 | 2.50 | 2.50 | 2.50 | 2.50 | 2.50 | 2.50 | 2.50 | 2.50 | 2.50 | 2.50 |
| | Dye (Y-1) | — | — | — | — | — | — | — | — | — | — |
| | Dye (M-1) | — | — | — | — | — | — | — | — | — | — |
| | Dye (C-1) | — | — | — | — | — | — | — | — | — | — |
| | Glycerol | 30.00 | 30.00 | 30.00 | 30.00 | 30.00 | 30.00 | 30.00 | 30.00 | 30.00 | 30.00 |
| | Triethylene glycol | — | — | — | — | — | — | — | — | — | — |
| | 1,2-hexanediol | — | — | — | — | — | — | — | — | — | — |
| | Butyltriglycol | 2.00 | 2.00 | 2.00 | 2.00 | 2.00 | 2.00 | 2.00 | 2.00 | 2.00 | 2.00 |
| | OLFINE (trade name) E1010 (*1) | 1.00 | 1.00 | 1.00 | 1.00 | 1.00 | 1.00 | 1.00 | 1.00 | 1.00 | 1.00 |
| | Anhitol (trade name) 20N (*2) | 11.43 (4.00) | 8.57 (3.00) | 8.57 (3.00) | 14.29 (5.00) | 14.29 (5.00) | 7.14 (2.50) | 7.14 (2.50) | 7.14 (2.50) | — | — |
| | UNISAFE (trade name) A-LE (*3) | — | — | — | — | — | — | — | — | 10.00 (3.00) | 16.67 (5.00) |
| | Softazoline (trade name) LAO (*4) | — | — | — | — | — | — | — | — | — | — |
| | ZIRMEL 1000 (*5) | 5.00 (1.00) | 2.50 (0.50) | 25.00 (5.00) | 2.50 (0.50) | 25.00 (5.00) | 2.50 (0.50) | 10.00 (2.00) | 25.00 (5.00) | 2.50 (0.50) | 25.00 (5.00) |
| | Water | balance | balance | balance | balance | balance | balance | balance | balance | balance | balance |
| Chromaticness | | 78.0 AA | 77.3 AA | 78.2 AA | 78.0 AA | 79.5 AA | 76.6 A | 77.0 A | 77.2 A | 77.4 AA | 79.4 AA |

| | | EXAMPLES | | | | | | | | | |
|---|---|---|---|---|---|---|---|---|---|---|---|
| | | 11 | 12 | 13 | 14 | 15 | 16 | 17 | 18 | 19 | 20 |
| Composition of Water-based Ink (% by weight) | C.I. Direct Yellow 86 | 2.50 | 2.50 | 2.50 | 2.50 | 2.50 | — | — | — | 2.50 | 2.50 |
| | Dye (Y-1) | — | — | — | — | — | 2.50 | — | — | — | — |
| | Dye (M-1) | — | — | — | — | — | — | 2.50 | — | — | — |
| | Dye (C-1) | — | — | — | — | — | — | — | 2.50 | — | — |
| | Glycerol | 30.00 | 30.00 | 30.00 | 25.00 | 25.00 | 30.00 | 30.00 | 30.00 | 30.00 | 30.00 |
| | Triethylene glycol | — | — | — | 5.00 | — | — | — | — | — | — |
| | 1,2-hexanediol | — | — | — | — | 5.00 | — | — | — | — | — |
| | Butyltriglycol | 2.00 | 2.00 | 2.00 | 2.00 | 2.00 | 2.00 | 2.00 | 2.00 | 2.00 | 2.00 |
| | OLFINE (trade name) E1010 (*1) | 1.00 | 1.00 | 1.00 | 1.00 | 1.00 | 1.00 | 1.00 | 1.00 | 1.00 | 1.00 |
| | Anhitol (trade name) 20N (*2) | — | — | 7.14 (2.50) | 11.43 (4.00) | 14.29 (5.00) | 11.43 (4.00) | 11.43 (4.00) | 11.43 (4.00) | 5.71 (2.00) | 14.29 (5.00) |
| | UNISAFE (trade name) A-LE (*3) | — | — | — | — | — | — | — | — | — | — |
| | Softazoline (trade name) LAO (*4) | 10.00 (3.00) | 16.67 (5.00) | 8.33 (5.00) | — | — | — | — | — | — | — |
| | ZIRMEL 1000 (*5) | 2.50 (0.50) | 25.00 (5.00) | 25.00 (5.00) | 5.00 (1.00) | 5.00 (1.00) | 5.00 (1.00) | 5.00 (1.00) | 5.00 (1.00) | 25.00 (5.00) | 1.50 (0.30) |
| | Water | balance | balance | balance | balance | balance | balance | balance | balance | balance | balance |
| Chromaticness | | 77.3 AA | 79.6 AA | 79.5 AA | 78.4 AA | 78.9 AA | 76.6 AA | 80.4 AA | 58.2 AA | 76.8 A | 77.0 A |

| | | COMPARATIVE EXAMPLES | | | | | | | | | |
|---|---|---|---|---|---|---|---|---|---|---|---|
| | | 1 | 2 | 3 | 4 | 5 | 6 | 7 | 8 | 9 | 10 |
| Composition of Water-based Ink (% by weight) | C.I. Direct Yellow 86 | 2.50 | — | — | — | 2.50 | 2.50 | 2.50 | 2.50 | 2.50 | 2.50 |
| | Dye (Y-1) | — | 2.50 | — | — | — | — | — | — | — | — |
| | Dye (M-1) | — | — | 2.50 | — | — | — | — | — | — | — |
| | Dye (C-1) | — | — | — | 2.50 | — | — | — | — | — | — |
| | Glycerol | 30.00 | 30.00 | 30.00 | 30.00 | 30.00 | 30.00 | 30.00 | 30.00 | 30.00 | 30.00 |
| | Butyltriglycol | 2.00 | 2.00 | 2.00 | 2.00 | 2.00 | 2.00 | 2.00 | 2.00 | 2.00 | 2.00 |
| | OLFINE (trade name) E1010 (*1) | 1.00 | 1.00 | 1.00 | 1.00 | 1.00 | 1.00 | 1.00 | 1.00 | 1.00 | 1.00 |
| | Anhitol (trade name) 20N (*2) | — | — | — | — | 14.29 (5.00) | — | 14.29 (5.00) | 14.29 (5.00) | — | — |

TABLE 1-continued

TABLE 1

| | | | | | | | | | | | |
|---|---|---|---|---|---|---|---|---|---|---|---|
| | Softazoline (trade name) LAO (*4) | — | — | — | — | — | — | — | — | 16.67 (5.00) | 16.67 (5.00) |
| | Trimethylamine oxide (*6) | — | — | — | — | — | — | — | — | — | — |
| | Anhitol (trade name) 24B (*7) | — | — | — | — | — | — | — | — | — | — |
| | ENAGICOL (trade name) C-40H (*8) | — | — | — | — | — | — | — | — | — | — |
| | ZIRMEL 1000 (*5) | — | — | — | — | — | 25.00 (5.00) | — | — | — | — |
| | Ca(NO$_3$)$_2$ (*9) | — | — | — | — | — | — | 0.10 | — | 0.10 | — |
| | ZrO(NO$_3$)$_2$•2H$_2$O | — | — | — | — | — | — | — | 0.10 | — | 0.10 |
| | Water | balance | balance | balance | balance | balance | balance | balance | balance | balance | balance |
| Chromaticness | | 74.3 — | 73.1 — | 77.0 — | 54.6 — | 76.5 B | 75.0 B | *10 | *10 | *10 | *10 |

| | | COMPARATIVE EXAMPLES | | | | | |
|---|---|---|---|---|---|---|---|
| | | 11 | 12 | 13 | 14 | 15 | 16 |
| Composition of Water-based Ink (% by weight) | C.I. Direct Yellow 86 | 2.50 | 2.50 | 2.50 | 2.50 | 2.50 | 2.50 |
| | Dye (Y-1) | — | — | — | — | — | — |
| | Dye (M-1) | — | — | — | — | — | — |
| | Dye (C-1) | — | — | — | — | — | — |
| | Glycerol | 30.00 | 28.00 | 28.00 | 30.00 | 30.00 | 30.00 |
| | Butyltriglycol | 2.00 | 2.00 | 2.00 | 2.00 | 2.00 | 2.00 |
| | OLFINE (trade name) E1010 (*1) | 1.00 | 1.00 | 1.00 | 1.00 | 1.00 | 1.00 |
| | Anhitol (trade name) 20N (*2) | — | — | — | — | 22.86 (8.00) | — |
| | Softazoline (trade name) LAO (*4) | — | — | — | — | — | — |
| | Trimethylamine oxide (*6) | 5.00 | — | — | — | — | — |
| | Anhitol (trade name) 24B (*7) | — | 11.54 | 19.23 | — | — | — |
| | ENAGICOL (trade name) C-40H (*8) | — | — | — | 14.29 | — | — |
| | ZIRMEL 1000 (*5) | 25.00 (5.00) | 2.50 (0.50) | 25.00 (5.00) | 25.00 (5.00) | — | 40.00 (8.00) |
| | Ca(NO$_3$)$_2$ (*9) | — | — | — | — | — | — |
| | ZrO(NO$_3$)$_2$•2H$_2$O | — | — | — | — | — | — |
| | Water | balance | balance | balance | balance | balance | balance |
| Chromaticness | | 75.0 B | 75.2 B | *10 | 75.4 B | 76.5 B | 75.1 B |

(following) - LEGEND
(*1): Acetylene glycol surfactant (ethylene oxide (10 mol) adduct of diol), produced by Nissin Chemical Co., Ltd, active ingredient: 100%
(*2): Lauryldimethylamine oxide, produced by Kao Corporation, active ingredient amount: 35% by weight, parenthesized numerals indicate active ingredient amounts
(*3): dihydroxyethyl laurylamine oxide, produced by NOF CORPORATION, active ingredient amount: 40% by weight, parenthesized numerals indicate active ingredient amounts
(*4): lauric acid amide propyldimethylamine oxide, produced by Kawaken Fine Chemicals Co., Ltd., active ingredient amount: 30% by weight, parenthesized numerals indicate active ingredient amounts
(*5): aqueous solution containing 20% by weight of K$_2$[Zr(CO$_3$)$_2$(OH)$_2$], produced by Nippon Light Metal Co., Ltd, parenthesized numerals indicate active ingredient amounts
(*6): Produced by Tokyo Chemical Industry, Co., Ltd.
(*7): Lauryldimethyl aminoacetic acid betaine, produced by Kao Corporation, active ingredient amount: 26% by weight
(*8): 2-alkyl-N-carboxymethyl-N-hydroxyethyl imidazolinium betaine, produced by Lion Corporation, active ingredient amount: 35% by weight
(*9): Produced by Kanto Chemical Co., Inc.
*10: Precipitates were observed in the water-based ink by use of the optical microscope (magnification: x200)

As indicated in TABLE 1, regarding each of the water-based inks of Examples 1 to 20, the chromaticness was greatly improved as compared with each of the water-based inks of Comparative Examples 1 to 4 prepared under the same conditions except that neither the Zr complex salt nor the surfactant represented by the formula (1) were used. Regarding each of the water-based inks of Examples 1 to 5 and 9 to 18 in which the blending amount of the Zr complex salt was 0.5% by weight or more and the blending amount of the surfactant represented by the formula (1) was 3% by weight or more, the chromaticness was remarkably improved as compared with each of the water-based inks of Comparative Examples 1 to 4 prepared under the same conditions except that neither the Zr complex salt nor the surfactant represented by the formula (1) were used.

On the other hand, regarding the water-based ink of Comparative Example 5 prepared without using the Zr complex salt, the chromaticness was improved as compared with the water-based ink of Comparative Example 1 prepared under the same conditions except that neither the Zr complex salt nor the surfactant represented by the formula (1) were used. The chromaticness of the water-based ink of Comparative Example 5, however, did not improve beyond the chromaticness of each of the water-based inks of Examples 1-15, 19, and 20. Regarding the water-based ink of Comparative Example 6 prepared without using the surfactant represented by the formula (1), the chromaticness was improved as compared with the water-based ink of Comparative Example 1 prepared under the same conditions except that neither the Zr complex salt nor the surfactant represented by the formula (1) were used. The chromaticness of the water-based ink of Comparative Example 6, however, was inferior to the chromaticness of each of the water-based inks of Examples 1 to 15, 19, and 20. Regarding each of the water-based inks of Comparative Examples 7 to 10 prepared by using, instead of the Zr complex salt, Ca(NO$_3$)$_2$ or ZrO(NO$_3$)$_2$.2H$_2$O, precipitates in each of the water-based inks were observed by use of the optical microscope (magnification: ×200). Regarding each of the water-based inks of Comparative Examples 11, 12, and 14 prepared by using, instead of the surfactant represented by the formula (1), one of trimethylamine oxide, lauryldimethyl aminoacetic acid betaine, and 2-alkyl-N-carboxymethyl-N-hydroxyethyl imidazolinium betaine, those of which are surfactants each having a chemical structure different from that of the formula (1), the chromaticness was improved as compared with the water-based ink of Comparative Example 1 prepared under the same conditions except that any of the above surfactants were not used. The chromaticness of each of the water-based inks of Comparative Examples 11, 12, and 14, however, was inferior to the chromaticness of each of the water-based inks of Examples 1 to 15, 19, and 20. Regarding the water-based ink of Comparative Example 13 prepared by increasing the content of lauryldimethyl aminoacetic acid betaine, precipitates in the water-based ink were observed by use of the optical microscope (magnification: ×200). Regarding the water-based ink of Comparative Example 15 prepared by using the surfactant represented by the formula (1), which was used in Comparative Example 5, in an amount 1.6 times greater than the amount used in Comparative Example 5 (8.00% by weight in Comparative Example 15), the chromaticness was same as that of the water-based ink of Comparative Example 5. Regarding the water-based ink of Comparative Example 16 prepared by using the Zr complex salt, which was used in Comparative Example 6, in an amount 1.6 times greater than the amount used in Comparative Example 6 (8.00% by weight in Comparative Example 16), the chromaticness was equivalent to that of the water-based ink of Comparative Example 6. The results of Comparative Examples 15 and 16 revealed that the chromaticness was not improved by merely increasing the amount of the surfactant represented by the formula (1) or the amount of the Zr complex salt, and the significant improvement in the chromaticness of the water-based ink of the present teaching was provided by the synergistic effect by using both of the surfactant represented by the formula (1) and the Zr complex salt.

As described above, the water-based ink of the present teaching can improve chromaticness without any increase in dye concentration. The way of use of the water-based ink of the present teaching is not particularly limited, and the water-based ink is widely applicable to various types of ink-jet recording.

What is claimed is:

1. A water-based ink for ink-jet recording comprising:
a colorant containing a dye;
water;
an anionic zirconium complex ion; and
a surfactant selected from the group consisting of dihydroxyethyl laurylamine oxide, lauric acid amide propyldimethylamine oxide, and a combination thereof,
wherein a blending amount of the surfactant is at least 3% by weight based on a total weight of the water-based ink.

2. The water-based ink for ink-jet recording according to claim 1, wherein the anionic zirconium complex ion has an anionic ligand.

3. The water-based ink for ink-jet recording according to claim 2, the anionic ligand is carbonato or hydroxo.

4. The water-based ink for ink-jet recording according to claim 1, wherein the anionic zirconium complex ion is [Zr(CO$_3$)$_2$(OH)$_2$]$^{2-}$.

5. The water-based ink for ink-jet recording according to claim 1, wherein the anionic zirconium complex ion is introduced in the water-based ink as a complex salt which forms the anionic zirconium complex ion in the water-based ink.

6. The water-based ink for ink-jet recording according to claim 4, wherein the anionic zirconium complex ion is introduced in the water-based ink as a complex salt which forms the anionic zirconium complex ion in the water-based ink; and
a counter ion of the anionic zirconium complex ion in the complex salt is an alkali metal ion or a quaternary ammonium ion.

7. The water-based ink for ink-jet recording according to claim 6, wherein the alkali metal ion or the quaternary ammonium ion is NH$^+$, Li$^+$, K$^+$, or Na$^+$.

8. The water-based ink for ink-jet recording according to claim 6, wherein the complex salt is K$_2$[Zr(CO$_3$)$_2$(OH)$_2$] or (NH$_4$)$_2$[Zr(CO$_3$)$_2$(OH)$_2$].

9. The water-based ink for ink-jet recording according to claim 5, wherein a blending amount of the complex salt forming the anionic zirconium complex ion in an entire amount of the water-based ink is 0.5% by weight or more.

10. The water-based ink for ink-jet recording according to claim 5, wherein a blending ratio of the complex salt forming the anionic zirconium complex ion to the surfactant is 0.1 to 1.7 by weight.

11. The water-based ink for ink-jet recording according to claim 1, wherein a blending ratio of the complex salt forming the anionic zirconium complex ion to the surfactant is 0.1 to 1.0 by weight.

12. The water-based ink for ink-jet recording according to claim 1, wherein the dye is an anionic dye.

13. An ink cartridge configured to contain a water-based ink for ink-jet recording, wherein the water-based ink is the water-based ink for ink-jet recording as defined in claim 1.

14. The water-based ink for ink-jet recording according to claim 1, wherein the colorant is an anionic dye,
the blending amount of the surfactant is 3% by weight to 5% by weight based on the total weight of the water-based ink;
the anionic zirconium complex ion is introduced in the water-based ink as a complex salt which forms the anionic zirconium complex ion in the water-based ink, where a blending amount of the complex salt forming the anionic zirconium complex ion is 0.5% by weight to 5.0% by weight based on the total weight of the water-based ink; and
a blending ratio of the complex salt forming the anionic zirconium complex ion to the surfactant is 0.16:1 by weight to 1:1 by weight.

* * * * *